(12) United States Patent
Dimicelli

(10) Patent No.: US 7,037,354 B1
(45) Date of Patent: May 2, 2006

(54) EXPANDABLE AIR FILTRATION APPARATUS

(76) Inventor: Anthony Dimicelli, 8282 Warren, Houston, TX (US) 77040

( * ) Notice: Subject to any disclaimer, the term of this patent is extended or adjusted under 35 U.S.C. 154(b) by 0 days.

(21) Appl. No.: 10/689,412

(22) Filed: Oct. 20, 2003

Related U.S. Application Data

(60) Provisional application No. 60/428,368, filed on Nov. 22, 2002, provisional application No. 60/428,369, filed on Nov. 22, 2002, provisional application No. 60/428,367, filed on Nov. 22, 2002.

(51) Int. Cl.
*B01D 27/06* (2006.01)

(52) U.S. Cl. ............................. 55/497; 55/517; 55/516; 55/506; 55/511; 55/521; 55/DIG. 31; 96/26

(58) Field of Classification Search .................. 55/497, 55/517, 516, 506, 511, 521, DIG. 31; 96/226

See application file for complete search history.

(56) References Cited

U.S. PATENT DOCUMENTS

| | | | |
|---|---|---|---|
| 4,420,315 A * | 12/1983 | Kershaw | ........................ 55/501 |
| 5,968,217 A | 10/1999 | Stein | |
| 6,152,980 A | 11/2000 | Culwell | |
| 6,214,076 B1 | 4/2001 | Beier | |
| 6,623,540 B1 * | 9/2003 | Clayton et al. | ............... 55/480 |
| 6,716,267 B1 * | 4/2004 | Lawlor, Sr. | ................... 55/506 |
| 6,740,137 B1 * | 5/2004 | Kubokawa et al. | ........... 55/521 |
| 6,843,820 B1 * | 1/2005 | Kubokawa | .................... 55/495 |

* cited by examiner

*Primary Examiner*—Minh-Chau T. Pham
(74) *Attorney, Agent, or Firm*—Buskop Law Group, P.C.; Wendy Buskop

(57) ABSTRACT

An apparatus for air filtration has a pleated filter media with an expandable mesh bonded to the pleated filter media, an outer frame, an inner frame, support members disposed within the outer and inner frame wherein the support members create openings in the inner frame and outer frame, and wherein the inner frame slides within the outer frame, and wherein the pleated filter media is disposed within the outer and inner frame and is attached to the outer first side and the inner first side and can grow and expand with the apparatus as the length is adjusted.

22 Claims, 6 Drawing Sheets

EXPANDABLE AIR FILTRATION APPARATUS

The present application claims priority to co-pending Provisional U.S. Patent Application Ser. No. 60/428,368 filed Nov. 22, 2002; co-pending Provisional U.S. Patent Application Ser. No. 60/428,369 filed Nov. 22, 2002; and co-pending Provisional U.S. Patent Application Ser. No. 60/428,367 filed Nov. 22, 2002.

FIELD

The present embodiments relate to air filtration apparatus that are expandable to fit various air duct sizes.

BACKGROUND

Numerous means exist for removing particle matter from atmospheric air before introducing air into a heating, venting and/or air conditioning system. Usually these systems have one or more removable and replaceable rigid filter elements that are manufactured to a specific length and height and being that are inserted into a channeled filter housing to effectively seal the unit from the introduction of dust, dirt, and pollen.

Over time the filter element will be periodically replaced due to the build up of contaminants on the filter media that requires the technician to purchase a filter element from the original equipment manufacturer or some third party supplier whose sole business is manufacturing generic filter elements.

This system leaves the technician with little choice but to stock every conceivable filter element and to carry them around from job site to job site or order the replacement filter element and schedule a second on-site maintenance call to install the element when it arrives.

Not only does this cost the service technician by having to visit the same site twice and having to perform certain functions twice, but also is an inconvenience to the client, having to shut the system down again. There is also the case of being unable to find or order the filter cartridge due to the age of the equipment, thereby requiring the installation of a filter cartridge that almost fits, which further stresses an aged system that will require more frequent maintenance visits and more time to remove the inevitable buildup of dirt and debris from within the system that is entering from around the edges of an ill fitting filter cartridge. Customers can't or won't understand why their system performance is so poor and feel that their service bureau is more interested in selling them a new system rather than maintaining the one they have.

Additionally, the replaceable rigid filter elements allow significant contaminated, un-cleaned airflow to circulate around the replaceable rigid filter elements due to variations in tolerances of the replaceable rigid filter elements and the original equipment manufacturer's channeled filter housing. This bypass forces the technician to mechanically clean the original equipment manufacturer's air conditioning system and the attached ductwork and air distribution registers more frequently than necessary if proper air seal integrity were achievable and is detrimental to the mechanical and thermodynamic efficiency of the original equipment manufacturer's air conditioning system.

Further, the standard practice of employing a cardboard superstructure to give rigidity to replaceable filter element described in the prior art causes the rigidity to deteriorate during high humidity conditions or rainstorms. Thus, producing situations in which the replaceable rigid filter element is drawn out of the original equipment manufacturer's air conditioning system channeled filter housing and into the air moving fan, therefore destroying the replaceable rigid filter element's ability to filter at all. The use of this cardboard superstructure also blinds a portion of the replaceable rigid filter element and reduces the capacity of the element to capture and retain particulate matter. Finally, the use of this cardboard superstructure demands the use of wood fiber and is not environmentally conservative.

Therefore, a need exists to provide the technician with the ability to fabricate the needed filter element on-site, on an as-needed basis and in a custom size providing a positive seal, eliminating the reliance on cardboard for rigidity all of which will reduce system maintenance, improve equipment performance, foster good customer relations, and assist in conserving valuable forest resources. Prior art reference includes Beier U.S. Pat. No. 6,214,076; Culwell U.S. Pat. No. 6,152,980; and Stein U.S. Pat. No. 5,968,217.

SUMMARY

An embodiment of the apparatus overcomes the shortcoming of the prior art by providing an apparatus for air filtration with two overlapping frames. Each frame contains pleated filter media and expandable mesh portioned on one side and laminated to the pleated filter media. Each of the frames has at least two front supports members. The overlapping frames allow the entire apparatus to be expanded to various sizes in order to fit different size air ducts.

BRIEF DESCRIPTION OF THE DRAWINGS

The present apparatus will be explained in greater detail with reference to the appended figures, in which.

The present apparatus is detailed below with reference to the listed Figures.

DETAILED DESCRIPTION OF THE PREFERRED EMBODIMENTS

Before explaining the present apparatus in detail, it is to be understood that the apparatus is not limited to the particular embodiments and that it can be practiced or carried out in various ways.

An embodiment is an apparatus (10) for air filtration. This apparatus can be used for air conditioning systems, heating systems, gas turbine systems, engine rooms, airplane fresh air intakes, and air purifiers. It can also be used for school systems, hospitals, homes, commercial buildings, aircraft carriers, boats, oil rigs, industrial plants, compressors, electrical control panels, and other end uses.

This apparatus is particularly useful as it can be made from recycled materials. The recycled materials have a significant environmental benefit in minimizing waste.

Figure 1:
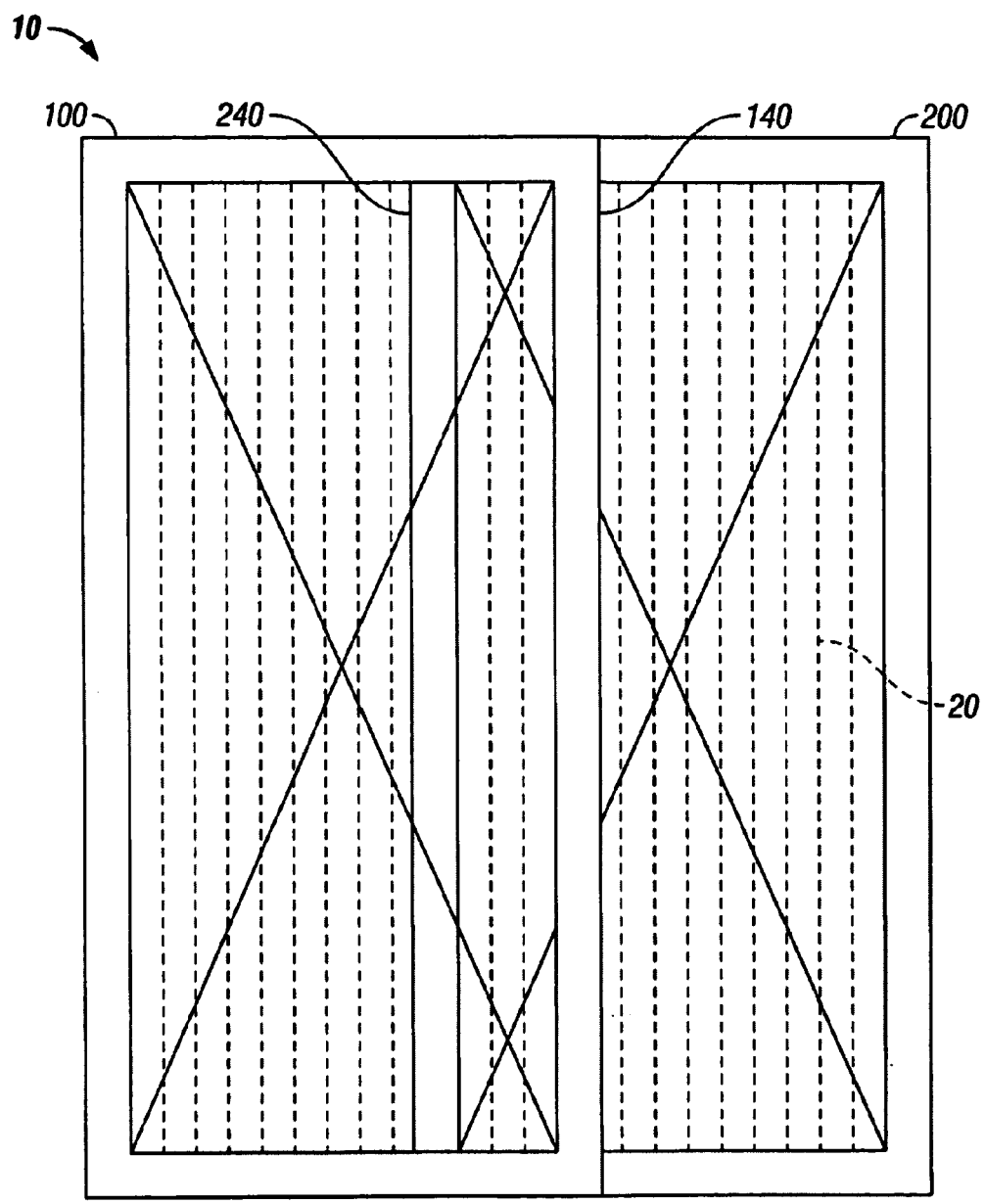
FIG. 1 depicts a front view of the apparatus.

FIG. 1 depicts the preferred embodiment of the apparatus. The apparatus contains an outer frame (100), an inner frame (200), and a pleated filter media (20). The material of the outer frame and the inner frame is preferably contemplated to be cardboard, wax coated cardboard, chip board, beverage board, paper board with a certain level of stiffness, and recyclable board.

The inner frame (200) slides into the outer frame (100) through the second outer side (140) of the outer frame (100). The inner frame preferably snugly fits within the outer frame yet enables sliding of the inner frame against the outer frame.

The inner frame (200) has a second inner side (240) that is open. The opened second inner side (240) and the opened second outer side (140) allows the pleated filter media (20) to cover both panels. Since the inner panel (200) slides back and forth in the outer panel (100), the apparatus (10) can be easily adjusted to a necessary length.

In a preferred embodiment, the pleated filter media is an electrostatic filter. The electrostatic filter is made of a synthetic non-woven material, but can also be a cotton blend. The filter media is available from Kimberly Clark of Atlanta, Ga., Columbus Industries of North Carolina, and HRS Textiles of North Carolina. The synthetic electrostatic filter can have polyolefin fibers, while the cotton blend filter can have polypropylene/polyester fibers. This style of filter promotes high efficiency with a low pressure drop, no fiber shedding, and no moisture absorption.

An embodiment is an apparatus for antimicrobial air filtration. The antimicrobial air filtration utilizes filter media with an antimicrobial coating. The antimicrobial air filter inhibits the growth of mold, mildew, fungi, and bacteria. The filter is also designed to be efficient in removing particulates from the air. The antimicrobial air filter destroys microorganisms on direct contact and improves air quality. The antimicrobial agent is non-migratory with no off-gassing.

An embodiment is an apparatus for carbon treated air filtration. Likewise, the carbon treated air filtration utilizes pleated carbon treated filter media, such as carbon impregnated polyester, that is efficient in removing particulates from the air.

In an alternative embodiment, the filter media can be self-supporting. In addition, the filter media can be heat treated by heat scoring the filter media. The filter media can be MERV rated and can also be adapted to include air fresheners.

Figure 2:
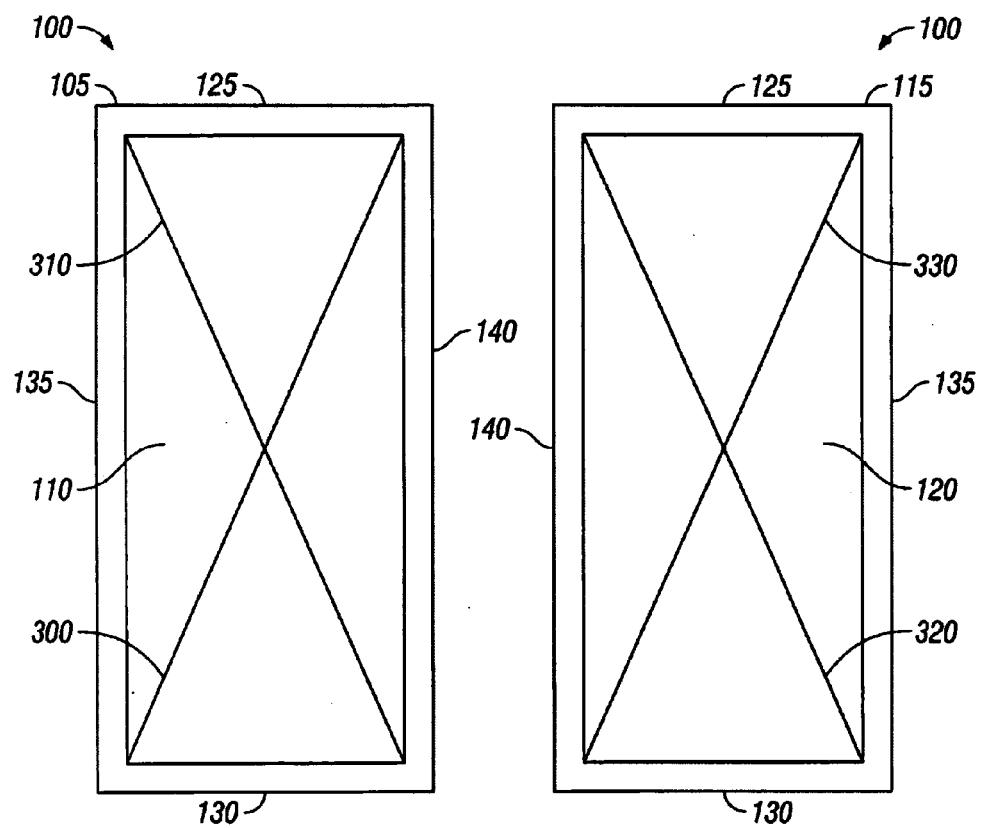
FIG. 2 depicts a front view the two inter-engaging panels of the front frame.

FIG. 2 is a view of the two parts of the outer frame (100). The outer frame has an outer front panel (105), an outer back panel (115), an outer top side (125), an outer bottom side (130), an outer first side (135), and an outer second side (140). The outer front panel (105) and outer back panel (115) are connected at the outer top side (125), the outer bottom side (130), and the outer side (135). The outer front panel and outer back panel are not connected on the outer second side (140). The outer second side (140) remains open to allow the inner panel (200) to slide through and to allow the pleated filter media (20) to stretch across both frames. The outer front panel (105) and the outer back panel (115) each have at least two supports members (300, 310, 320, and 330). The support members create an open space in both the outer front panel (105) and the outer back panel (115). The spaces, an outer front panel opening (110) and an outer back panel opening (120), allow air to pass though the apparatus across the pleated filter media (20). In a preferred embodiment, the sides are glued together to form the panels.

Figure 3:
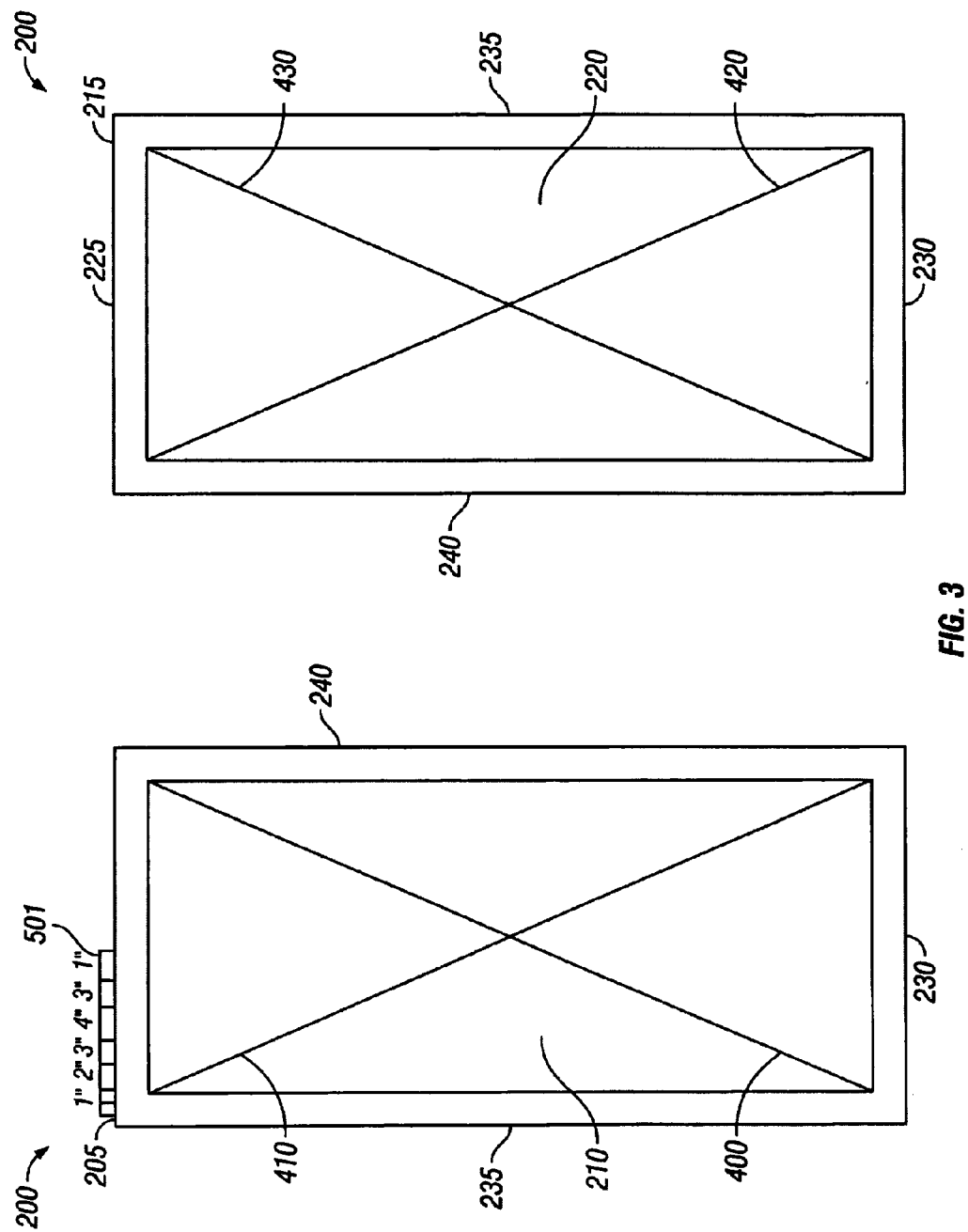
FIG. 3 depicts a front view of the two inter-engaging panels of the back frame.

FIG. 3 is a view of the two parts of the inner frame (200). The inner frame (200) is similar to the outer frame (100) shown in FIG. 2. The inner frame (200) has an inner front panel (205), an inner back panel (215), an inner top side (225), an inner bottom side (230), an inner first side (235), and an inner second side (240). The inner front panel (205) and inner back panel (215) are connected at the inner top side (225), the inner bottom side (230), and the inner side (235). Again, the front panel (205) and back panel (215) are not connected on the inner second side (240) to allow the pleated filter media (20) to stretch across both panels. The inner front panel (205) has at least two inner front supports members (400 and 410) to create an inner front panel opening (210). The inner back panel (215) also has at least two inner back supports members (420 and 430) to create an inner back panel opening (220). Again, the openings allow air to pass though the apparatus across the pleated filter media (20). The inner frame (200) can also include a measuring tape (501).

Figure 4:
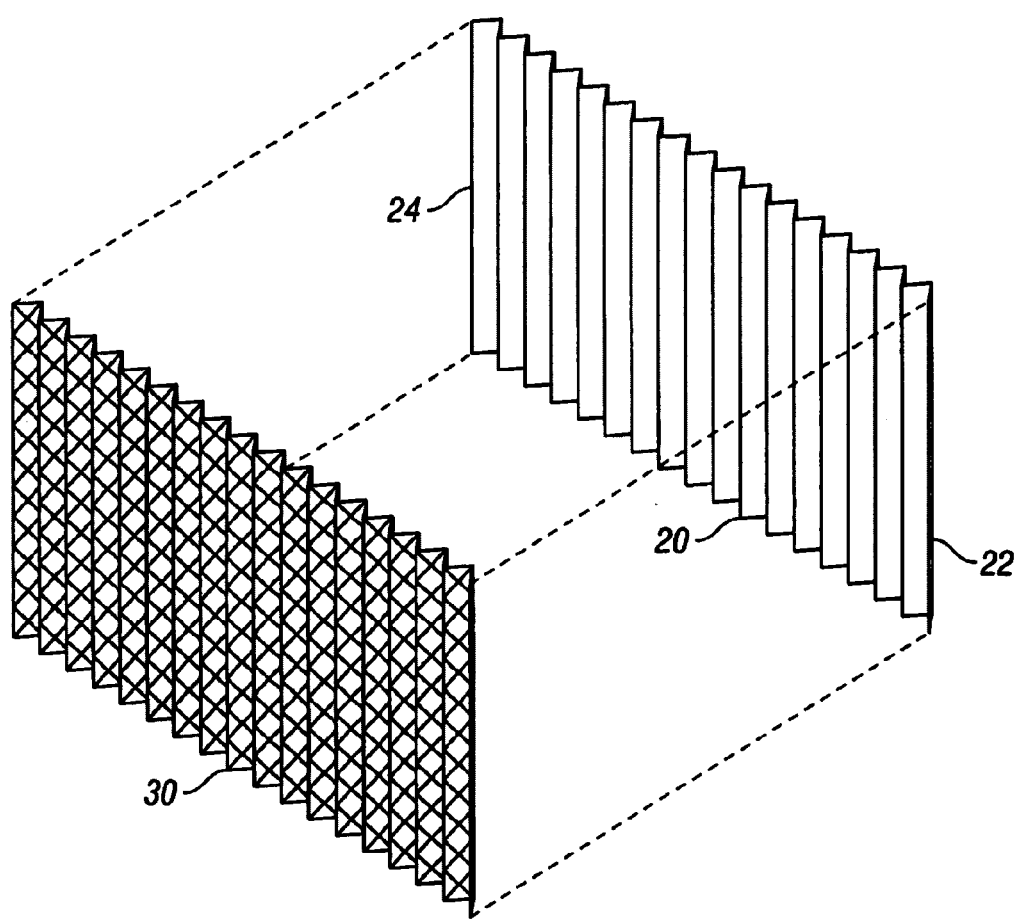
FIG. 4 depicts an expanded perspective view of the expandable mesh laminated onto the pleated filter media.

The pleated filter media (20) has a pleated first edge (22) and a pleated second edge (24), as shown in FIG. 4. An expandable mesh (30) is portioned on one side of the pleated filter media (20). A typical expanded mesh usable in this invention is available from Expanded Technology, of Brunswick Me. or Dorstener of Houston, Tex.

The expandable mesh (30) is laminated to the pleated filter media (20). The expandable mesh (30) can be laminated with hot glue. The pleats in the pleated filter media (20) allow the material to shrink and expand with the changing length of the apparatus. The pleated filter media (20) can have between 4 pleats per foot and 30 pleats per foot. The expandable mesh (30) can also be an expanded aluminum mesh. The bonded wire mesh is laminated to the filter media. Further, the wire mesh can be a welded wire.

Figure 5:
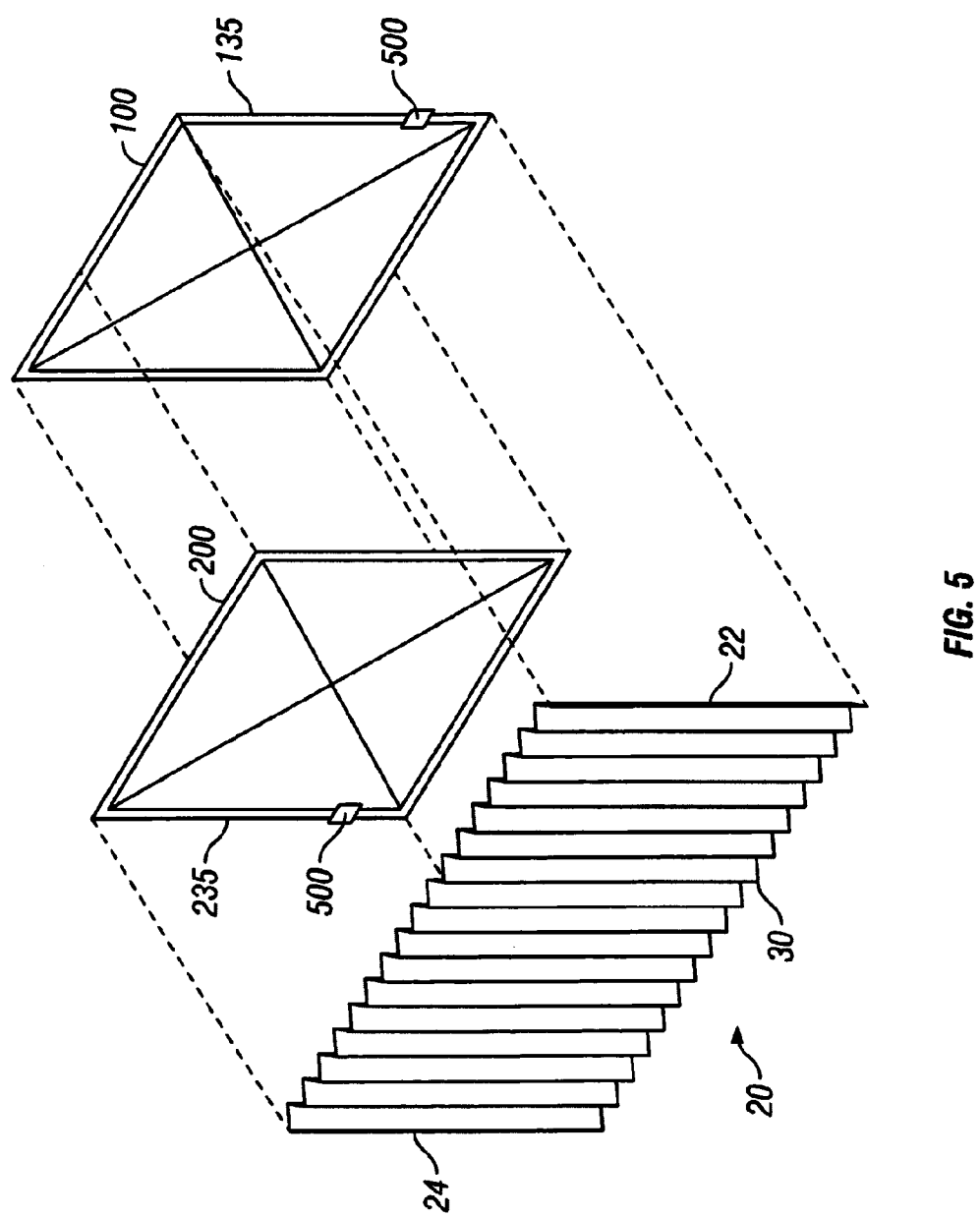
FIG. 5 depicts an expanded perspective view of the pleated filter media as it fits into the back and front panels.

FIG. 5 is an expanded perspective view of the apparatus. In particular, FIG. 5 shows that the pleated filter media (20) is disposed inside the outer frame (100) and the inner frame (200). The pleated first edge (22) is attached to the outer first side (135) of the outer frame (100). The pleated second edge (24) is attached to the inner first side (235) of the inner frame (200). Since the pleated filter media (20) is attached in such a manner, the media can expand and shrink with the length of the apparatus as the inner frame (200) slides in and out of the outer frame (100) affecting the overall length.

Figure 6A:
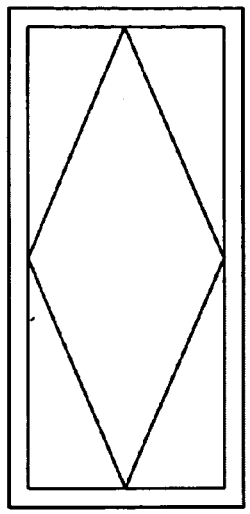
FIG. 6a depicts a front view of support members in a "diamond" shape.
Figure 6B:
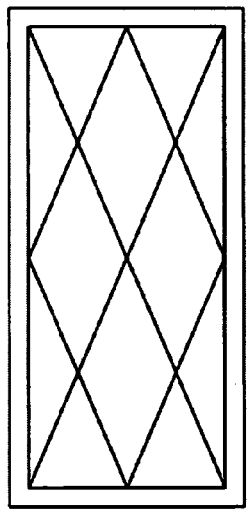
FIG. 6b depicts a front view of support members in a combination of the "diamond" shape and the "X" shape.
Figure 6C:
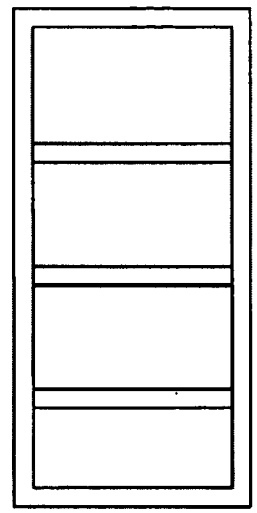
FIG. 6c depicts a front view of three support members in a parallel orientation.
Figure 6D:
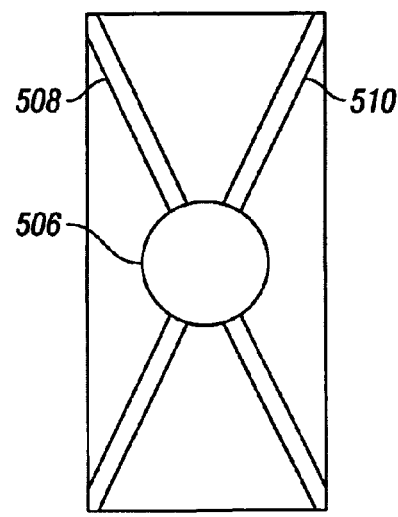
FIG. 6d depicts a is a front view of a support configuration having a circle with a plurality of support arms.

The support members can form an "X" shape, a "diamond" shape, cut design, rectangular shape, square shape, a shape of a circle with radial arms, or combinations thereof. The die cut design can be a logo for a company. FIG. 1 through FIG. 5 shows the embodiment of the "X" shape. FIG. 6a shows the embodiment of the diamond" shape. FIG. 6b shows the embodiment of the combination of the "X" shape and the "diamond" shape. FIG. 6c shows the embodiment of the rectangular shape, three support members in a parallel orientation. FIG. 6d shows the embodiment of a circle (506) with radial arms (508 and 510). The alternative embodiments of support member shapes can be found in the outer front panel (105), the outer back panel (115), the inner front panel (205), and the inner back panel (215).

The apparatus can have a width of ¾ inch, 1 and ¾ inch, 3 and ¾ inches. Any width within this range is acceptable. Also, as to size for the apparatus, it is contemplated that for a 1, 2 or 4 inch pleat, the range for a nominal size would run from 12 inches×12 inches×1 inch to 25 inches×50×1 inches, and for an actual size, would range from 11.5×11.5×1 through 24.5×49.5×1 inch.

The outer frame (100) and the inner frame (200) can have the shape of a rectangle, square, or circle. The preferred embodiment is a rectangle.

Figure 6E:
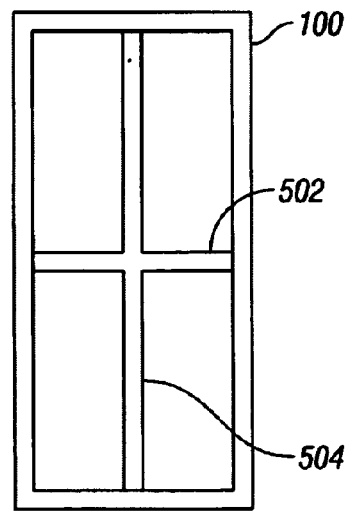
FIG. 6e depicts front view of a support configuration wherein at least one vertical member and one horizontal member are used.

The outer frame (100) can have a first horizontal support and a first vertical support and the inner frame (200) can have a second horizontal support and a second vertical support. FIG. 6e is a front view of a support configuration wherein at least one vertical (504) member and one horizontal member (502) are used in the outer frame (100). Again, in alternative embodiments, this support member shape can be found in the outer front panel (105), the outer back panel (115), the inner front panel (205), and the inner back panel (215).

In another alternative, the outer frame (100) can have a first circle support member engaging at least two opposing edges on the first frame and the inner frame (200) can have a second circle support member engaging at least two opposing edges on the second frame.

The apparatus can also have a locking component (500) disposed on the outer frame to prevent movement of the inner frame while supporting the filter media. FIG. 5 shows the locking components (500). The locking component can be tape or a slidable tab.

An embodiment is an air conditioning system. The air conditioning system involves the apparatus (10) for air filtration as described herein, an air intake, and a blower connected to an intake duct having a first end and a second end. The air intake duct connects to the air intake on the first end and connects the blower on the second end. The air conditioning system also has a motor to drive the blower for blowing air from the intake duct second end to a coil. A heating element in the system communicates with the coil for receiving air that passed over the coil. A condensing unit connects to the coil and controls coil temperature. The system also has outflow ducts that direct the flowing air from the heating element to an air return. The apparatus for air filtration is located in the air return.

An embodiment is a heating system. Like the air conditioning system, the heating system involves the apparatus (10) for air filtration as described herein, an air intake, and a blower connected to an intake duct having a first end and a second end. The heating system also has a motor, a heating element, a condensing unit, and an outflow duct. The apparatus for air filtration is located in the air return.

While this apparatus has been described with emphasis on the preferred embodiments, it should be understood that within the scope of the appended claims, the apparatus might be practiced other than as specifically described herein.

What is claimed is:

1. An apparatus for air filtration comprising:
   a. a pleated filter media comprising a pleated first edge and a pleated second edge;
   b. an expandable mesh positioned on one side of the pleated filter media, wherein the expandable mesh is bonded to the face of the pleated filter media;
   c. an outer frame comprising an outer front panel, an outer back panel, an outer top side, an outer bottom side, an outer first side, and an outer second side, wherein the outer front panel and outer back panel are connected at the outer top side, the outer bottom side, and the outer side;
   d. an inner frame comprising an inner front panel, an inner back panel, an inner top side, an inner bottom side, an inner first side, and an inner second side, wherein the inner front panel and inner back panel are connected at the inner top side the inner bottom side, and the inner side;
   e. at least two outer front supports members in the outer front panel creating an outer front panel opening;
   f. at least two outer back supports members in the outer back panel creating an outer back panel opening;
   g. at least two inner front supports members in the inner front panel creating an inner front panel opening;
   h. at least two inner back supports members in the inner back panel creating an inner back panel opening;
   i. wherein the inner frame slides into the outer frame between the outer front panel and outer back panel; and
   j. wherein the pleated filter media is disposed inside the outer frame and the inner fame and the pleated first edge is attached the outer frame first side and the pleated second edge is attached to the inner frame first side.

2. The apparatus of claim 1, wherein the pleated filter media comprises between 4 pleats per foot and 30 pleats per foot.

3. The apparatus of claim 1, wherein the pleated filter media is an electrostatic filter media that is made of synthetic or cotton blend.

4. The apparatus of claim 1, wherein the pleated filter media is a heat treated media.

5. The apparatus of claim 1, wherein the outer frame and the inner frame comprise a shape selected from the group consisting of rectangle, square, and circle.

6. The apparatus of claim 1, further comprising a locking component disposed on the outer frame to prevent movement of the inner frame while supporting the filter media.

7. The apparatus of claim 1, wherein the locking component is tape.

8. The apparatus of claim 7, wherein the locking component is a slidable tab adapted for engaging the outer frame and the inner frame.

9. The apparatus of claim 1, wherein the expandable mesh is an expanded aluminum mesh.

10. The apparatus of claim 1, wherein the expandable mesh is laminated with glue.

11. The apparatus of claim 1, wherein the at least two front support members and the at least two back support members each form a shape selected from the group consisting of an "X" shape, a "diamond" shape, die cut design, rectangular shape, square shape, a shape of a circle with radial arms, and combinations thereof.

12. The apparatus of claim 11, wherein the dic cut design is a logo for a company.

13. The apparatus of claim 1, wherein the outer frame further comprises a first horizontal support and a first vertical support and the inner frame further comprises a second horizontal support and a second vertical support.

14. The apparatus of claim 1, wherein the outer frame further comprises a first circle support member engaging at least two opposing edges on the first frame and the inner frame with a first arm and a second arm further comprises a second circle support member engaging at least two opposing edges on the second frame.

15. The apparatus of claim 1, wherein the bonded wire mesh is laminated to the filter media.

16. The apparatus of claim 1, wherein the wire mesh is a welded wire.

17. The apparatus of claim 1, further comprising a measuring tape disposed on the inner frame.

18. The apparatus of claim 1, further comprising an air freshener disposed in the outer frame.

19. An apparatus for antimicrobial air filtration comprising:
a. a pleated antimicrobial filter media comprising a pleated first edge and a pleated second edge, wherein the pleated antimicrobial filter media is treated with a chemically reactive antimicrobial surface;
b. an expandable mesh positioned on one side of the pleated antimicrobial filter media, wherein the expandable mesh is bonded to the face of the pleated antimicrobial filter media;
c. an outer fame comprising an outer front panel, an outer back panel, an outer top side, an outer bottom side, an outer first side, and an outer second side, wherein the outer front panel and outer back panel are connected at the outer top side the outer bottom side, and the outer side;
d. an inner frame comprising an inner front panel, an inner back panel, an inner top side, an inner bottom side, an inner first side, and an inner second side, wherein the inner front panel and inner back panel are connected at the inner top side the inner bottom side, and the inner side;
e. at least two outer front supports members in the outer front panel creating an outer front panel opening;
f. at least two outer back supports members in the outer back panel creating an outer back panel opening;
g. at least two inner front supports members in the inner front panel creating an inner front panel opening;
h. at least two inner back supports members in the inner back panel creating an inner back panel opening;
i. wherein the inner frame slides into the outer frame between the outer front panel and outer back panel; and
j. wherein the pleated antimicrobial filter media is disposed inside the outer frame and the inner frame and the pleated first edge is attached the outer frame first side and the pleated second edge is attached to the inner frame first side.

20. An apparatus for carbon treated air filtration comprising:
a. a pleated carbon treated filter media comprising a pleated first edge and a pleated second edge, wherein the pleated carbon treated filter media is treated with activated carbon;
b. an expandable mesh positioned on one side of the pleated carbon treated filter media, wherein the expandable mesh is bonded to the face of the pleated carbon ed filter media;
c. an outer frame comprising an outer front panel, an outer back panel, an outer top side, an outer bottom side, an outer first side, and an outer second side, wherein the outer front panel and outer back panel are connected at the outer top side the outer bottom side, and the outer side,
d. an inner frame comprising an inner front panel, an inner back panel, an inner top side, an inner bottom side, an inner first side, and an inner second side, wherein the inner front panel and inner back panel are connected at the inner top side the inner bottom side, and the inner side;
e. at least two outer front supports members in the outer front panel creating an outer front panel opening;
f. at least two outer back supports members in the outer back panel creating an outer back panel opening;
g. at least two inner front supports members in the inner front panel creating an inner front panel opening;
h. at least two inner back supports members in the inner back panel creating an inner back panel opening;
i. wherein the inner frame slides into the outer frame between the outer front panel and outer back panel; and
j. wherein the pleated carbon treated filter media is disposed inside the outer frame and the inner frame and the pleated first edge is attached the outer frame first side and the pleated second edge is attached to the inner fame first side.

21. An air conditioning system comprising:
a. air intake;
b. intake ducts comprising a first end and a second end, connected to the air intake for flowing air on a first end;
c. a blower connected to the intake duct at the second end;
d. a motor to drive the blower for blowing air from the intake duct second end to a coil;
e. a heating element in communication with the coil for receiving air which was passed over the coil;
f. a condensing unit connected to the coil for controlling coil temperature;
g. outflow ducts for flowing air from the heating element to an air return;
h. an air return; and
i. a filter disposed in the air return for conditioning the air, wherein the filter comprises
 i. a pleated filter media comprising a pleated first edge and a pleated second edge;
 ii. an expandable mesh positioned on one side of the pleated filter media, wherein the expandable mesh is laminated to the pleated filter media;
 iii. an outer frame comprising an outer front panel, an outer back panel, an outer top side, an outer bottom side, an outer first side, and an outer second side, wherein the outer front panel and outer back panel are connected at the outer top side, the outer bottom side, and the outer side;
 iv. an inner frame comprising an inner front panel, an inner back panel, an inner top side, an inner bottom side, an inner first side, and an inner second side, wherein the inner front panel and inner back panel are connected at the inner top side, the inner bottom side, and the inner side;
 v. at least two outer front supports members in the outer front panel creating an outer front panel opening;
 vi. at least two outer back supports members in the outer back panel creating an outer back panel opening;
 vii. at least two inner front supports members in the inner front panel creating an inner front panel opening;
 viii. at least two inner back supports members in the inner back panel creating an inner back panel opening;
 ix. wherein the inner frame slides into the outer frame between the outer front panel and outer back panel; and
 x. wherein the pleated filter media is disposed inside the outer frame and the inner frame and the pleated first edge is attached the outer frame first side and the pleated second edge is attached to the inner frame fist side.

22. A heating system comprising:
a. air intake;
b. intake ducts comprising a first end and a second end, connected to the air intake for flowing air on a first end;
c. a blower connected to the intake duct at the second end;

d. a motor to drive the blower for blowing air from the intake duct second end to a coil;
e. a heating element in communication with the coil for receiving air which was passed over the coil;
f. outflow ducts for flowing air from the heating element to an air return;
g. an air return; and
h. a filter disposed in the air return for conditioning the air, wherein the filter comprises
  i. a pleated filter media comprising a pleated first edge and a pleated second edge;
  ii. an expandable mesh positioned on one side of the pleated filter media, wherein the expandable mesh is laminated to the pleated filter media;
  iii. an outer frame comprising an outer front panel, an outer back panel, an outer top side, an outer bottom side, an outer first side, and an outer second side, wherein the outer front panel and outer back panel are connected at the outer top side, the outer bottom side, and the outer side;
  iv. an inner frame comprising an inner front panel, an inner back panel, an inner top side, an inner bottom side, an inner first side, and an inner second side, wherein the inner front panel and inner back panel are connected at the inner top side, the inner bottom side, and the inner side;
  v. at least two outer front supports members in the outer front panel creating an outer front panel opening;
  vi. at least two outer back supports members in the outer back panel creating an outer back panel opening;
  vii. at least two inner front supports members in the inner front panel creating an inner front panel opening;
  viii. at least two inner back supports members in the inner back panel creating an inner back panel opening;
  ix. wherein the inner frame slides into the outer frame between the outer front panel and outer back panel; and
wherein the pleated filter media is disposed inside the outer frame and the inner frame and the pleated first edge is attached the outer frame first side and the pleated second edge is attached to the inner frame first side.

* * * * *